US00RE47467E

(19) United States
(12) Reissued Patent
Bartlett et al.

(10) Patent Number: US RE47,467 E
(45) Date of Reissued Patent: Jul. 2, 2019

(54) LAVATORY

(71) Applicant: Bradley Fixtures Corporation, Menomonee Falls, WI (US)

(72) Inventors: Lauren Clarise Bartlett, Wauwatosa, WI (US); Douglas John Carpiaux, Milwaukee, WI (US); William L. Haas, Richfield, WI (US)

(73) Assignee: Bradley Fixtures Corporation, Menomonee Falls, WI (US)

(21) Appl. No.: 29/612,895

(22) Filed: Aug. 4, 2017

Related U.S. Patent Documents

Reissue of:
(64) Patent No.: Des. 735,837
Issued: Aug. 4, 2015
Appl. No.: 29/511,179
Filed: Dec. 8, 2014

(51) LOC (11) Cl. ..... 23-02
(52) U.S. Cl.
USPC ..... D23/290
(58) Field of Classification Search
USPC ... D23/284, 286, 287, 290, 291, 293.1, 303, D23/308; D24/234

(Continued)

(56) References Cited

U.S. PATENT DOCUMENTS

D171,756 S 3/1954 Haggstrom
2,767,407 A 10/1956 Weiss (Continued)

FOREIGN PATENT DOCUMENTS

EM 779202 1/2004
EM 947271 3/2004

(Continued)

*Primary Examiner* — Philip S Hyder
(74) *Attorney, Agent, or Firm* — Boyle Fredrickson, S.C.

(57) CLAIM

We claim the ornamental design for a lavatory, as shown and described.

DESCRIPTION

Figure 1:
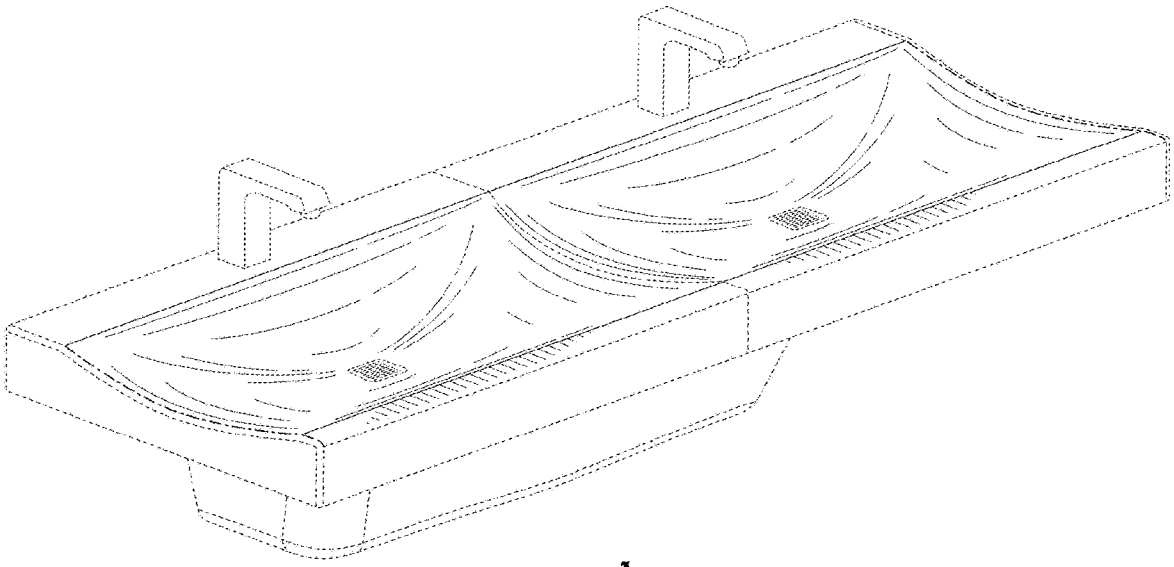
Figure 2:
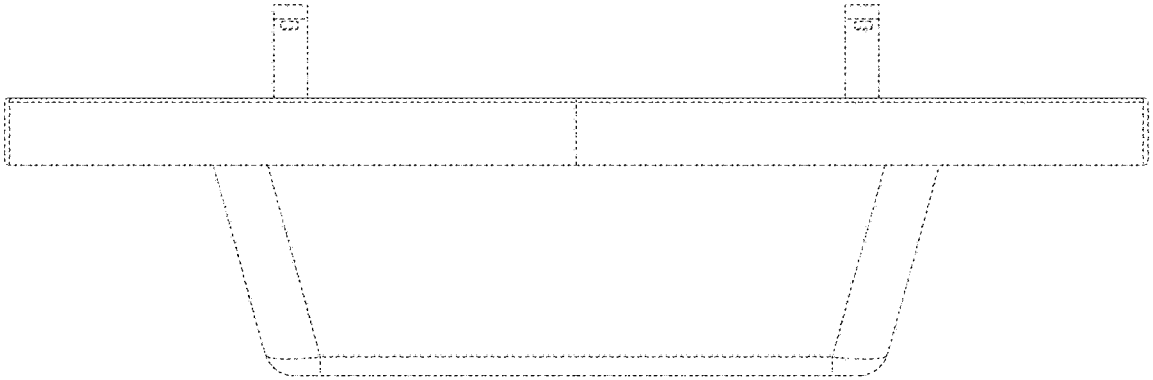
Figure 3:
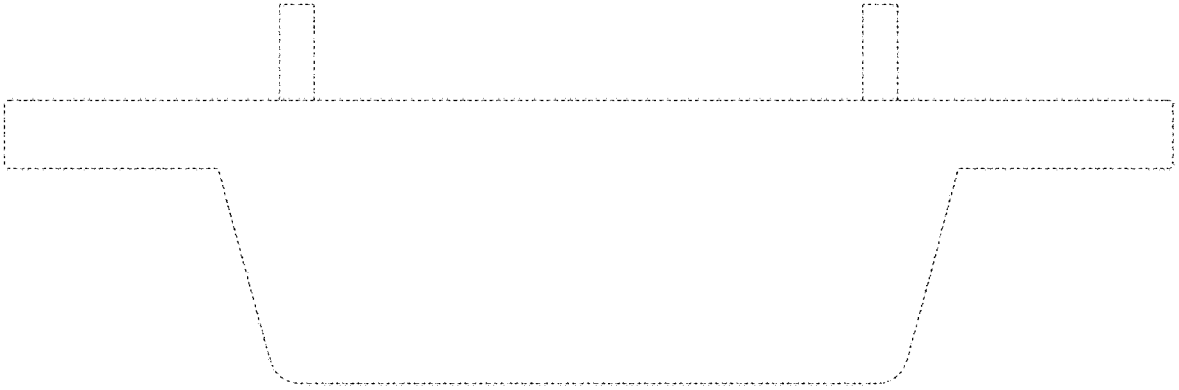
Figure 4:
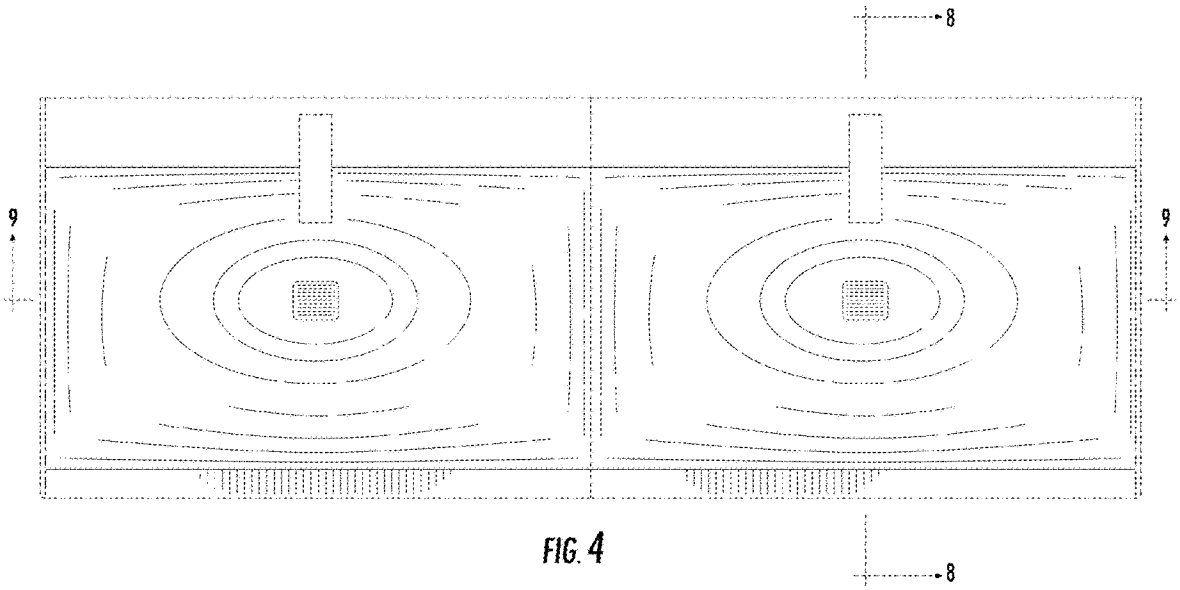
Figure 5:
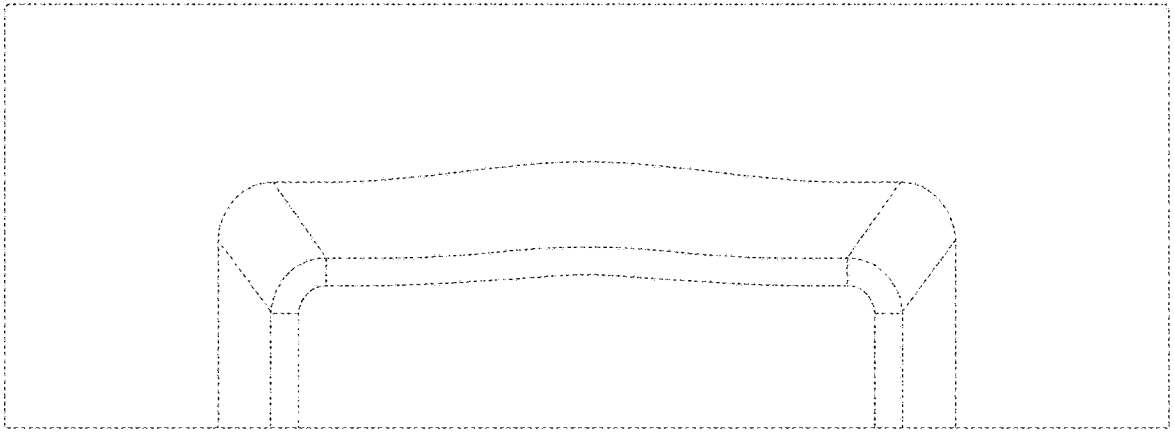
Figure 6:
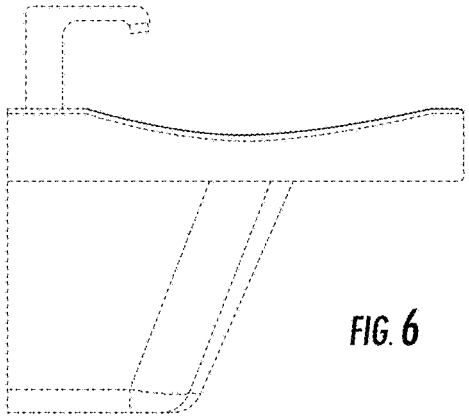
Figure 7:
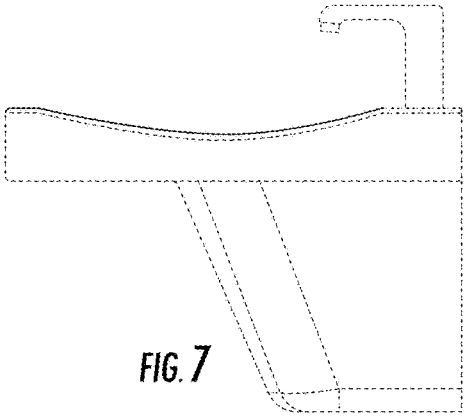
Figure 8:
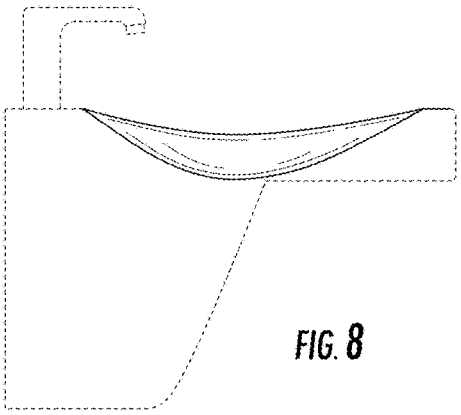
Figure 9:
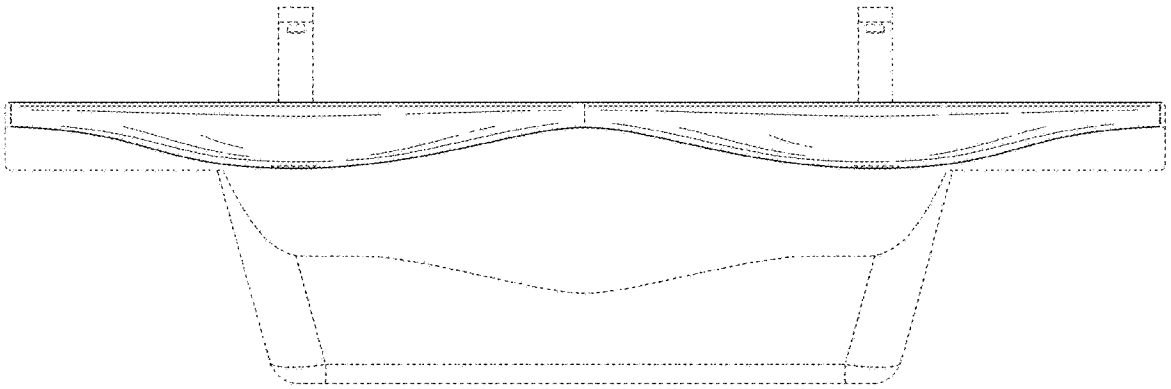

FIG. 1 is a perspective view of an embodiment of the claimed design;
FIG. 2 is a front view thereof;
FIG. 3 is a rear view thereof;
FIG. 4 is a top view thereof;
FIG. 5 is a bottom view thereof;
FIG. 6 is a left side view thereof;
FIG. 7 is a right side view thereof;
FIG. 8 is a section view thereof taken along line 8-8 in FIG. 4; [and.]
FIG. 9 is a section view thereof taken along line 9-9 in FIG. 4[.];
*FIG. 10 is a perspective view of another embodiment of the claimed design;*
*FIG. 11 is a front view thereof;*
*FIG. 12 is a rear view thereof;*
*FIG. 13 is a top view thereof;*
*FIG. 14 is a bottom view thereof;*
*FIG. 15 is a left side view thereof;*
*FIG. 16 is a right side view thereof;*
*FIG. 17 is a section view thereof taken along line 17-17 in FIG. 13; and,*
*FIG. 18 is a section view thereof taken along line 18-18 in FIG. 13.*

The ornamental design which is claimed is shown in solid lines in the drawings. The broken lines in the drawings are for illustrative purposes only and form no part of the claimed design. Broken lines formed by equal length dashes show unclaimed portions of the design. Broken lines formed of unequal length dashes (i.e., dash-dot) show boundaries between claimed and unclaimed portions of the design.

1 Claim, 16 Drawing Sheets

Matter enclosed in heavy brackets [ ] appears in the original patent but forms no part of this reissue; matter printed in italics indicates the additions made by reissue.

(58) Field of Classification Search
CPC ..... A47K 1/04; A47B 77/06; A47J 47/20
See application file for complete search history.

(56) References Cited

U.S. PATENT DOCUMENTS

| | | | |
|---|---|---|---|
| D187,017 | S | 1/1960 | Wald |
| D198,016 | S | 4/1964 | Kaiser |
| D207,249 | S | 3/1967 | Kaiser |
| D208,394 | S | 8/1967 | Kaiser |
| D208,966 | S | 10/1967 | Kaiser |
| 3,451,068 | A | 6/1969 | Phillips, Jr. |
| 3,508,282 | A | 4/1970 | Phillips, Jr. |
| D225,403 | S | 12/1972 | Brendgord |
| D251,795 | S | 5/1979 | McCann |
| D319,691 | S | 9/1991 | Yvetot |
| D353,448 | S | 12/1994 | Chiu |
| 5,611,093 | A | 3/1997 | Barnum et al. |
| D434,124 | S | 11/2000 | McKeone |
| D492,015 | S | 6/2004 | Kergoet |
| D518,560 | S | 4/2006 | Arkay-Leliever |
| 7,039,963 | B2 | 5/2006 | Loberger et al. |
| D538,407 | S | 3/2007 | Bates et al. |
| D538,905 | S | 3/2007 | Wano |
| D545,414 | S | 6/2007 | Maruhashi et al. |
| D545,415 | S | 6/2007 | Tani et al. |
| D563,533 | S | 3/2008 | Kakihana et al. |
| D592,292 | S | 5/2009 | Kakihana et al. |
| D598,081 | S | 8/2009 | Soulier |
| D598,989 | S | 8/2009 | Kakihana et al. |
| D598,990 | S | 8/2009 | Duringer et al. |
| D611,128 | S | 3/2010 | Soulier |
| D622,365 | S | 8/2010 | Schonherr et al. |
| D624,632 | S | 9/2010 | Booth et al. |
| D625,792 | S | 10/2010 | Rundberg et al. |
| D629,877 | S | 12/2010 | Rundberg |
| D646,365 | S | 10/2011 | Parekh |
| D663,016 | S | 7/2012 | Figurski et al. |
| D687,530 | S | 8/2013 | McGuire et al. |

FOREIGN PATENT DOCUMENTS

| | | |
|---|---|---|
| EM | 1151001 | 3/2004 |
| EM | 1151003 | 3/2004 |
| EM | 1959871 | 9/2004 |
| EM | 1769871 | 11/2004 |
| EM | 2305941 | 12/2004 |
| EM | 2502122 | 1/2005 |
| EM | 3086713 | 3/2005 |
| EM | 3086714 | 3/2005 |
| EM | 3086715 | 3/2005 |
| EM | 5678702 | 9/2006 |
| EM | 8533203 | 2/2008 |
| EM | 8686742 | 9/2008 |
| EM | 110168723 | 4/2009 |
| EM | 11203728 | 5/2009 |
| EM | 15528376 | 7/2009 |
| EM | 7592047 | 10/2009 |
| EM | 7232752 | 11/2009 |
| EM | 162804118 | 11/2009 |
| EM | 18733325 | 6/2011 |
| WO | DM50901 | 2/2000 |
| WO | DM72571 | 10/2009 |

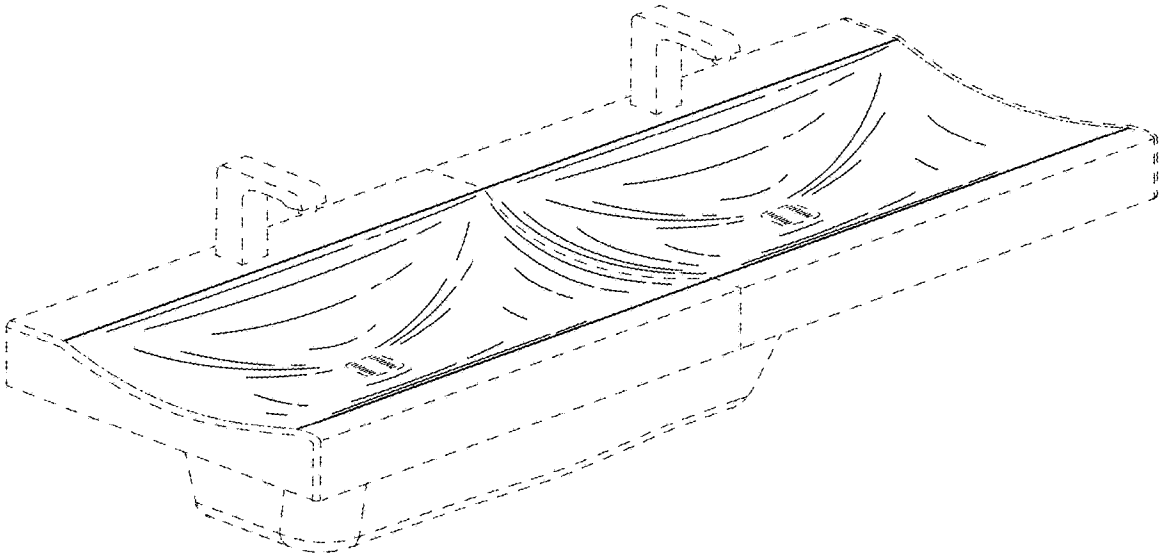
Fig. 10 (New)

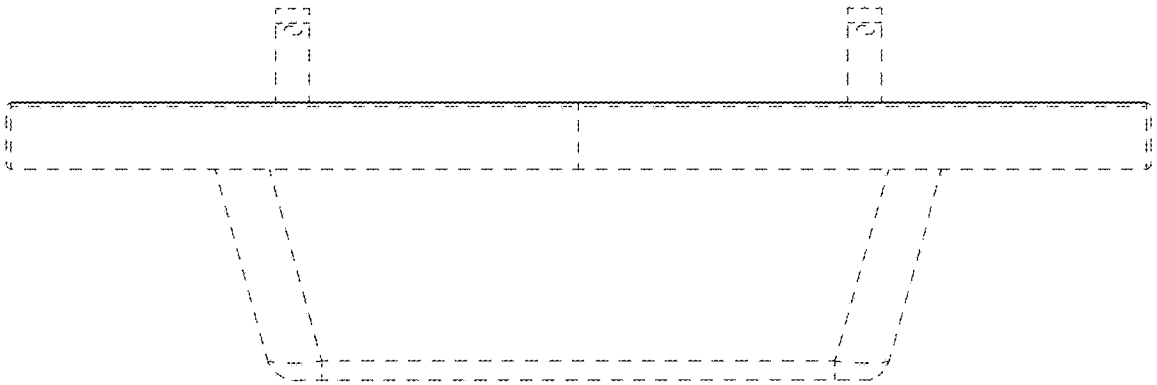
Fig. 11 (New)

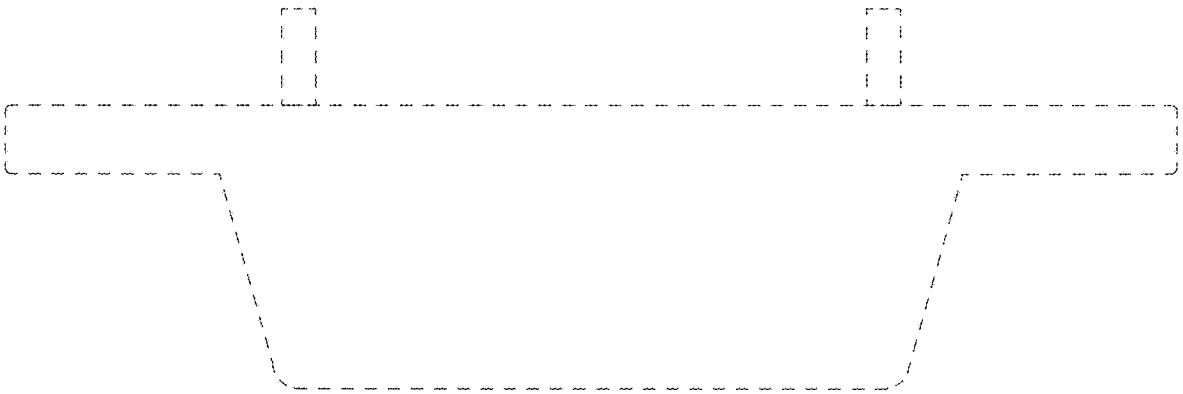
Fig. 12 (New)

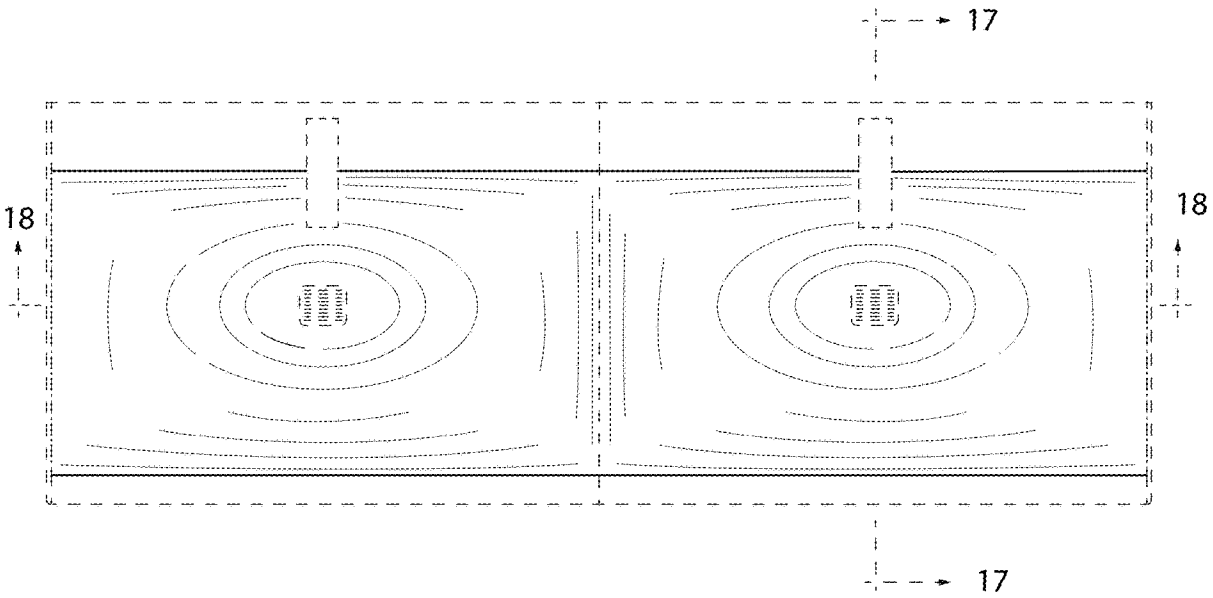
Fig. 13 (New)

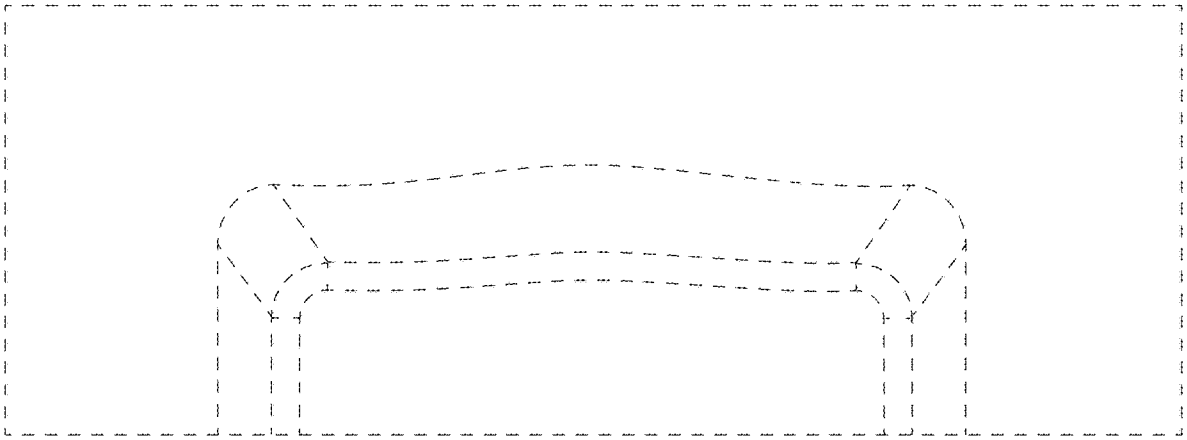
Fig. 14 (New)

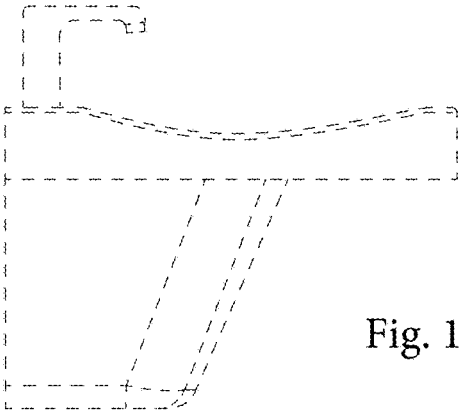
Fig. 15 (New)
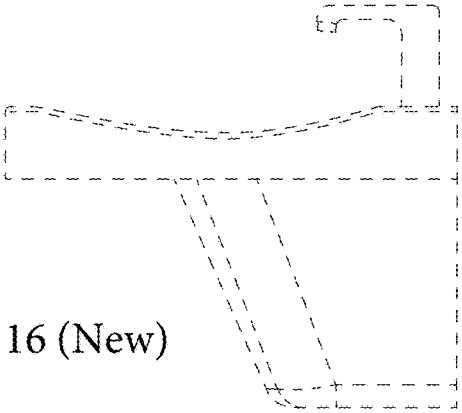
Fig. 16 (New)

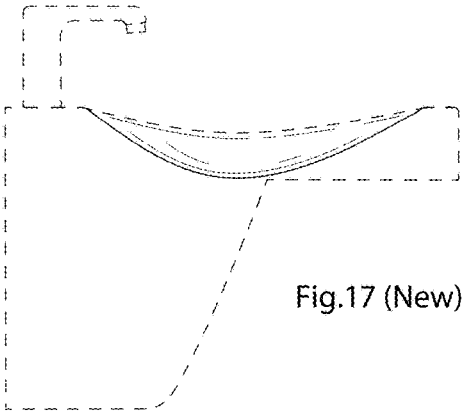
Fig.17 (New)

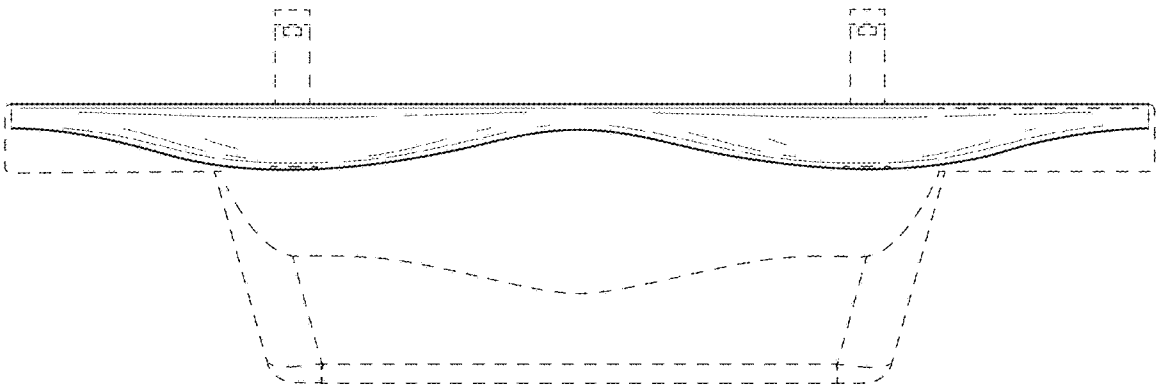
Fig. 18 (New)